United States Patent

[11] 3,627,376

| [72] | Inventor | Loren E. Tyler |
| | | Wayzata, Minn. |
| [21] | Appl. No. | 855,295 |
| [22] | Filed | Sept. 4, 1969 |
| [45] | Patented | Dec. 14, 1971 |
| [73] | Assignee | Letco, Inc. |
| | | Long Lake, Minn. |

[54] COVER MEANS FOR AGRICULTURAL TRANSPORT DEVICES
10 Claims, 7 Drawing Figs.

[52] U.S. Cl. ................................................. 296/98
[51] Int. Cl. ................................................. B60j 11/00
[50] Field of Search ........................................ 296/98, 106; 280/5; 160/243; 222/176; 239/664, 668, 669

[56] References Cited
UNITED STATES PATENTS

| 2,336,899 | 12/1943 | Stern | 160/243 |
| 2,465,621 | 3/1949 | Wheeler | 296/100 |
| 2,591,186 | 4/1952 | Neitzke | 296/98 |
| 3,024,063 | 3/1962 | Robinson | 296/100 |
| 3,168,345 | 2/1965 | Roberts et al. | 296/100 |
| 3,450,431 | 6/1969 | Tyler | 296/100 |

FOREIGN PATENTS

| 693,979 | 7/1951 | Great Britain | 296/98 |

*Primary Examiner*—Benjamin Hersh
*Assistant Examiner*—Robert R. Song
*Attorneys*—Donald R. Sjostrom and Robert P. White ABSTRACT: A fertilizer spreader including a hopper or tank for containing particulate material and having a large rectangular opening at the top thereof for loading the hopper and a cover for the opening. Around the opening the hopper has an upstanding flange and the cover which is of flexible material such as a tarp, is tightly secured to the hopper, outside of the flange, at one side of the opening, preferably at the front. The cover is sufficiently large so that it overlaps the flange on all sides and at the back end of the opening has a rigid member which permits it to be easily rolled forward and secured there when the opening is to be left open. It also has a plurality of elastic fastening members which cooperate with appropriate hooks on the hopper to provide quick release means for securing the cover under tension in its closed position wherein it extends tightly downward over the flange to provide a substantially weathertight seal with the flange. The cover, being secured at one edge to the hopper and having means which render it easily secured to the hopper in its extended position is easy to handle and can quickly be opened or closed by a single person.

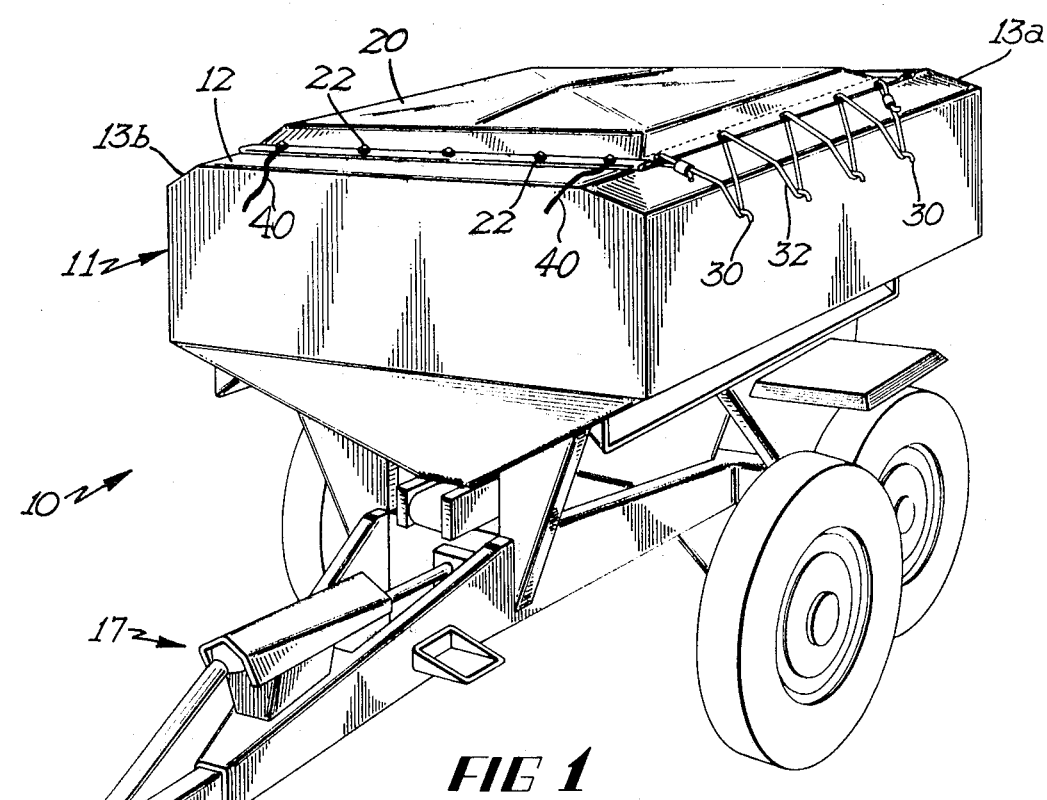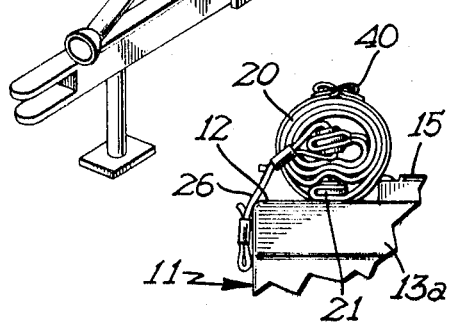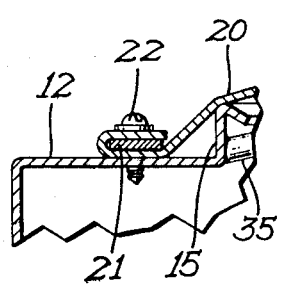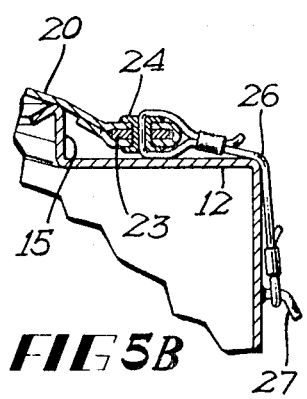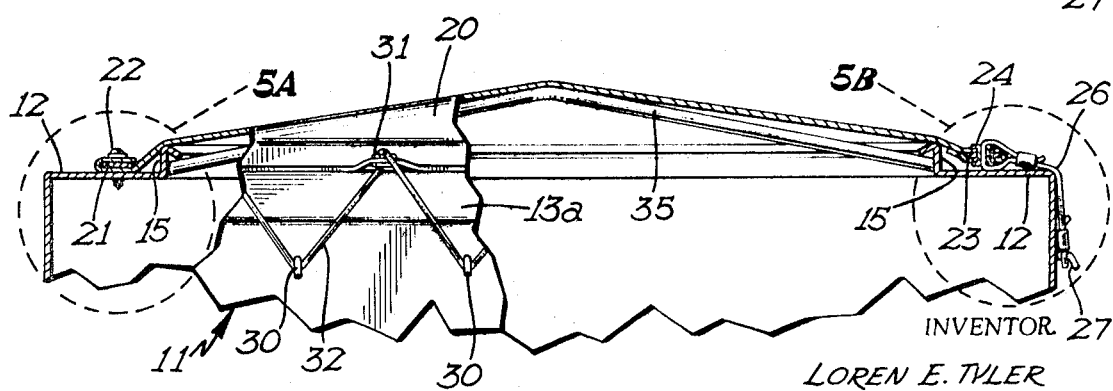

INVENTOR.
LOREN E. TYLER
BY Donald R. Sjostrom
ATTORNEY

COVER MEANS FOR AGRICULTURAL TRANSPORT DEVICES

BACKGROUND OF THE INVENTION

This invention relates to cover means for an agricultural transport device such as a fertilizer spreader or the like. These spreaders may be of the trailer type which are pulled by a truck or tractor and have a large hopper which may hold several tons of material. Customarily these devices have a large opening at the top so that they can be easily filled with the material which they are to haul. Generally this is a particulate material such as fertilizer or feed and it is therefore desirable to cover the opening during times other than when the unit is being filled to protect the contents from the weather and also to prevent the material from blowing away, especially when the device is being towed at relatively high speeds.

In the past it has been customary to utilize a piece of tarp which was large enough to cover the opening and which was simply thrown over the top of the hopper and tied down on all sides when it was desired to cover the spreader. When the tarp was removed it was generally waded up and stashed wherever it was most convenient, generally in the towing vehicle. When it was desired to put the tarp on, it was a rather difficult and time consuming job, especially in a strong wind. Generally the tarp does not provide a very tight cover and it is not unusual for rain to find its way into the hopper or for the tarp to flap in the wind while the device is being transported. The problem of covering the hopper on devices of this type can be substantially overcome by the use of large metal or fiberglass doors such as those disclosed in the applicant's recently issued U.S. Pat. No. 3,450,431 which is assigned to the assignee of the present invention. However, in some instances it is desired that a less expensive cover be provided which will nevertheless overcome some of the problems set forth above.

BRIEF SUMMARY OF INVENTION

This invention provides, in combination with a fertilizer spreader or the like having a relatively large hopper with an opening in the top, an improved cover means which is relatively inexpensive but which provides a relatively weathertight cover which can be easily and quickly opened or closed by a single person and which is conveniently stored when it is not used to close the opening.

Specifically, the invention provides a cover for an agricultural transport device such as a fertilizer spreader which has a hopper with a relatively large opening in its top surface and which has an understanding flange extending substantially all of the way around the opening. Preferably this opening is rectangular in shape. The cover includes a sheet of relatively flexible material such as a tarp which has a length and width exceeding the length and width of the opening in the hopper and is sufficiently large to extend over the flange an all sides of the opening. One edge of the sheet member is tightly secured to the hopper at one side of the opening and outside of the flange. The sheet is located so that it is extendable to cover the opening in its entirely and to extend beyond the flange on each side thereof. The three remaining edges of the sheet member have elastic fastening means which cooperate with means on the hopper for providing easily releasable connections with the hopper which maintain the cover in tension so that it is pulled down tightly over the flange on the hopper to provide a relatively weathertight seal therewith. Preferably the edge of the sheet which is permanently fastened to the hopper is at the forward side of the opening. Also, the back edge of the sheet preferably has secured to it a rigid member to facilitate fastening of this rear edge to the hopper and also to facilitate easy rolling of the sheet member on the rigid member from rear to front of the hopper and so that it can conveniently be secure at the front of the hopper when the opening is to be left open. Preferably the two side edges of the sheet member have a plurality of eyelets spaced therealong and each edge has an elongated elastic cord which is loosely looped through the eyelets and each of the loops cooperates with a hook on the hopper to provide easily releasable connections between the cover and the hopper.

This structure assures that the cover, although it is a relatively simple and inexpensive one, cooperates with the upstanding flange which is also important to add to the strength of the structure, to provide a relatively weathertight seal. The cover becomes an integral part of the machine and thus cannot be mislaid and does not present a storage problem when the hopper is to be left open. It can easily be rolled open or closed and fastened down by means of the elastic fastening means by a single person, even under relatively windy conditions.

An object of the invention is to provide an improved tarp type of cover for the hopper of an agricultural transport device such as a fertilizer spreader.

Another object of the invention is to provide a relatively inexpensive and simple cover for the opening in the hopper of a fertilizer spreader or the like which will provide a relatively good weathertight seal but which can be easily and quickly removed when desired.

Another object of the invention is to provide a cover as aforesaid which is an integral part of the machine so that there is no danger of it being mislaid and which can be easily and conveniently stored when the opening is to be left open.

Another object of the invention is to provide a cover as aforesaid which can be opened or closed relatively easily by a single person even under windy conditions.

These and other objects of the invention will become apparent upon reading the following detailed description of the invention.

BRIEF DESCRIPTION OF DRAWING

FIG. 1 is a perspective view, as seen from the upper left front corner, of a fertilizer spreader utilizing the cover means of this invention.

FIG. 4 is a fragmentary cross sectional view taken longitudinally through the center of the spreader of FIG. 1 and disclosing the cover means of this invention in its closed position.

FIG. 5A is an enlarged fragmentary view of the front portion of the spreader as seen in FIG. 2.

FIG. 5B is an enlarged fragmentary cross sectional view taken generally at the rear of the spreader as indicated in FIG. 2.

FIG. 6 is a fragmentary view of the front end of the spreader with the cover rolled and disposed in its stored position.

DETAILED DESCRIPTION

Figure 2:
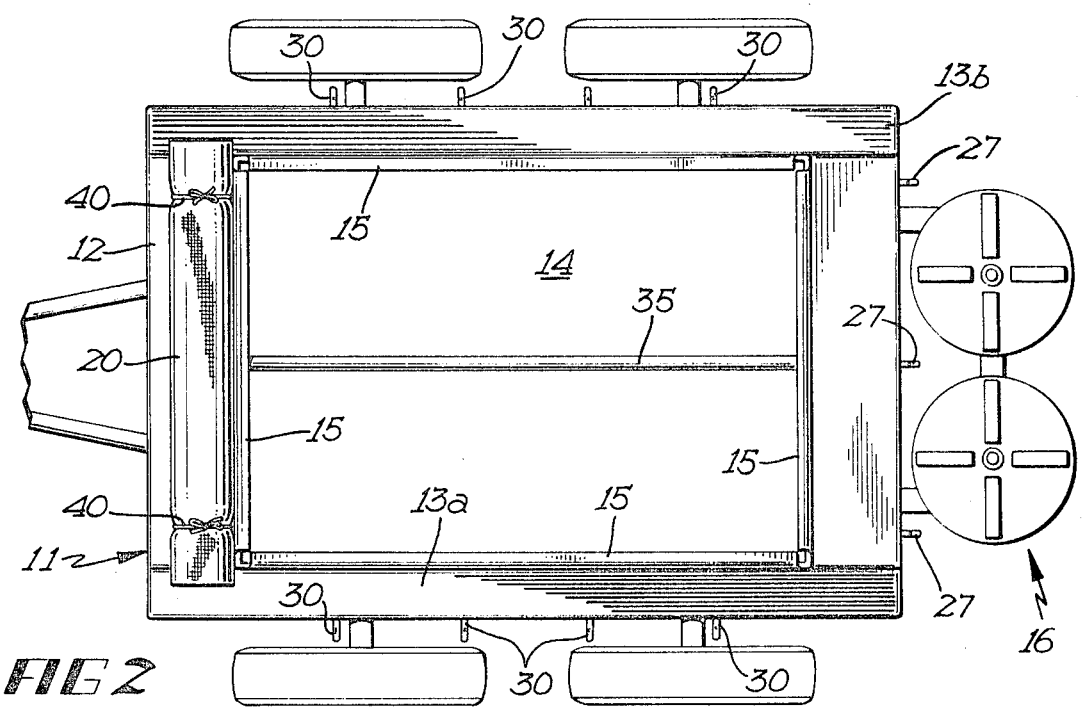
FIG. 2 is a top view, partially schematically shown, of the spreader of FIG. 1 with the cover means of this invention in its open or stored position.

Referring to the drawing, reference numeral 10 generally designates a fertilizer spreader having a tank or hopper 11 mounted on a frame 12 which is provided with a plurality of wheels and which is adapted to be connected to a truck or tractor for towing. A hopper of this type may also be mounted directly on the bed of a truck if desired. Only a brief description of the details of the spreader per se will be given as is necessary in order to describe the present invention. Hopper 11 provides a large container for particulate material such as fertilizer or feed or the like and may have a capacity, by way of example, in the range from 4 to 8 or 10 tons. Hopper 11 has a relatively flat top surface 12 which may include slightly inclined surfaces 13a and 13b extending longitudinally at the outer edges of the hopper. In the top surface, hopper 11 has a relatively large rectangular opening 14 through which the hopper can be filled. Surrounding this opening, the hopper has an upstanding flange 15 which extends substantially all of the way around the opening. This flange may serve several purposes including strengthening of the hopper itself and providing a smooth rounded edge for the opening, as well as providing a weathertight seal with a cover as will be seen hereinafter.

While it has not been disclosed, it will be understood that the hopper includes a conveyor means, normally located at the bottom of the hopper, to convey material to the rear where it is distributed by an appropriate distributing means 16 which is shown only schematically in the drawings since it forms no part of this invention. Similarly, an appropriate means such as flexible drive means 17 is provided for connection to a power take-off to operate the spreading apparatus.

The structure described thus far is generally conventional in a fertilizer spreader of the type which is utilized rather widely at the present time and is manufactured by a number of manufactures including the assignee of the present invention. While a fertilizer spreader has been described, the present invention is applicable to any type of agricultural transport device which has a relatively large hopper with a large opening at the top. Generally these are used either for fertilizer or for feeds and generally these are relatively fine particulate materials. Therefore, it is often essential that the opening be covered to protect it from rain and also to keep the material from being blown away by the wind, particularly when the unit is towed at relatively high speeds. Obviously this can be done by simply throwing a tarp over the top and somehow tying it down and this has been the most usual approach in the past. This has presented substantial problems in that the top had to be stored somewhere when it was removed and often it was simply waded and thrown in the truck which towed the unit. Then when it was to be replaced it was a rather difficult job because the tarp was heavy and difficult to handle and presented a real problem, particularly under windy conditions, if a person had to put the tarp on by himself.

The present invention overcomes these problems while still providing a relatively inexpensive and very simple cover. A sheet of material 20 which is relatively flexible and wind and waterproof, such as tarp, is provided. Sheet 20 is preferably generally rectangular in shape and is a of size so that it exceeds both the length and width of opening 14. At the forward end of the hopper, sheet 20 is permanently and rigidly secured to the hopper on the outside of flange 15 and generally parallel thereto. Preferably the edge of sheet 20 is sandwiched between a rigid member 21 and the top surface 12 of the hopper. Member 21 extends the full width of sheet member 20 and may be of any rigid material such as metal or it may be a strip of hard wood. Strip 21 may be attached to the hopper by any appropriate means such as sheet metal screws 22. This assures that the forward edge of sheet 20 is tightly held against the upper surface of the hopper to provide a relatively weathertight seal.

Figure 3:
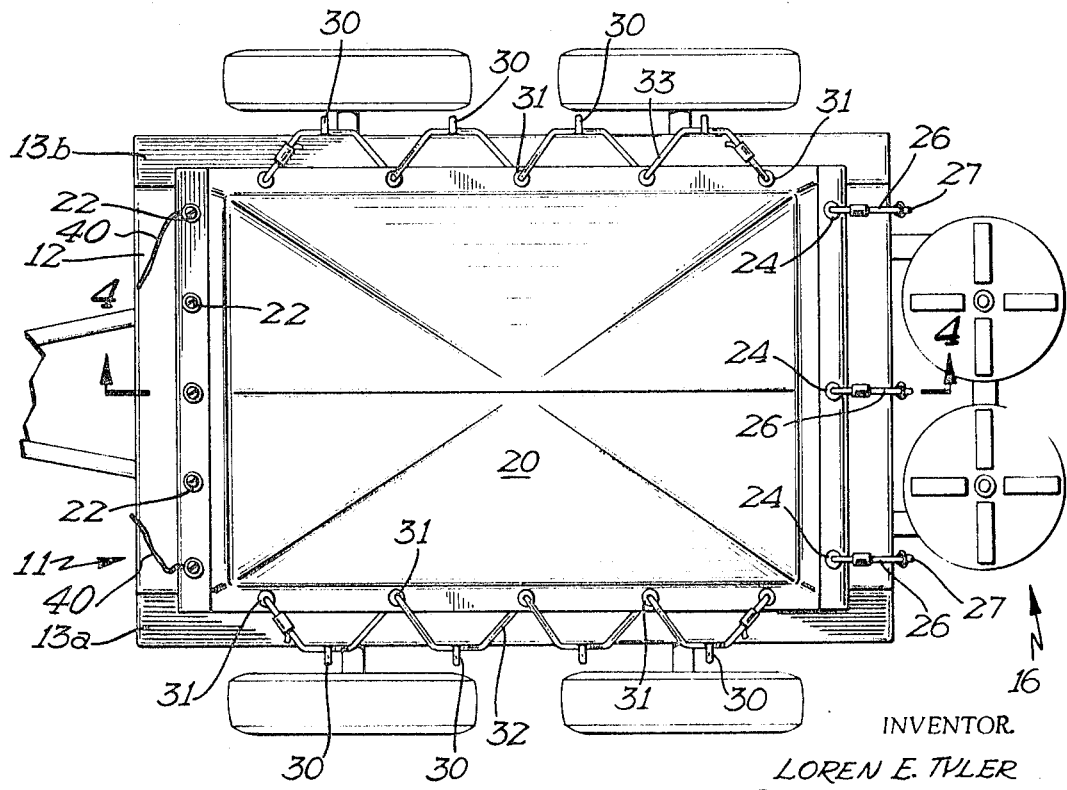
FIG. 3 is a top view of the spreader, similar to FIG. 2, but with the cover means closed.

At the rear edge of member 20 it also has secured thereto as by looping it over, a rigid member 23 which extends the full width of member 20. Member 23 may be secured to sheet 20 by appropriate means such as grommets or eyelets 24 which extend through both thicknesses of sheet 20 and through strip 23. In the disclosed arrangement three of these eyelets are used, one near each edge and one at approximately the center of the rear edge of sheet 20. Obviously, more may be used if desired. Fastened to the rear edge of sheet 20 by means of eyelets 24 are elastic tiedown members 26 having a loop at the lower end which can be releasibly attached to cooperating hooks 27 which are welded on the back side of the hopper. Members 26 are of an elastic material so that they can be stretched and hooked over the hooks 27 and will maintain cover sheet 20 in tension. As can be seen in FIG. 3, this urges cover sheet 20 both rearwardly and downwardly.

Along each side of the hopper, on the vertical surface thereof, there are provided a plurality of spaced downwardly extending hooks 30. Along each edge of cover sheet 20 it is provided with appropriated spaced eyelets 31. Looped loosely through these eyelets is an elastic cord member. Cord 32 extends through the loops on the left side of hopper 11 and cord 33 through the loops on the right-hand side of the hopper. As can be seen best in FIG. 3, the cords are fixed to the last eyelet at the front and rear ends of cover 20 but in between they are simply looped through the eyelets. Eyelets 31 and cooperating hooks 30 are disposed longitudinally so that each hook is located approximately midway between two adjacent eyelets. Thus, each loop in the cord is hooked over one of the hooks thus maintaining the cover sheet 20 in lateral, as well as longitudinal tension, pulling it both to the side and downward. The center portion of cover sheet 20 is supported by a longitudinally extending frame member 35 which runs generally centrally of the hopper, is secured at each end under flange 15, and bows upward slightly at the center.

As can perhaps best be seen in FIGS. 5A and 5B, the structure is such that cover sheet 20 is not only held in tension both longitudinally and laterally but is urged downwardly over the upper surface of flange 15 to provide a good seal which is substantially weathertight. Obviously, having the forward edge of the cover permanently fixed to the top of the hopper is preferable but any of the edges may be the one which is permanently fastened down. With the forward one used, the problem of wind entering at the front and tending to lift the cover when the vehicle is towed is overcome.

When it is desired to remove the cover, elastic fastening members 26 at the rear are simply stretched down and released from hooks 27 and the loops in cords 32 and 33 are stretched and released from the cooperating hooks 30. Then the cover is rolled about rigid strip 23 from the rear to the front of the spreader and the roll is left at the forward edge of the hopper. Appropriate ties 40 may be provided to maintain the cover in a roll at this position. It will be appreciated that when it is desired to again cover the opening in the hopper, ties 40 are simply united and cover sheet 20 rolled to the rear and the elastic fasteners hooked over their cooperating hooks. Obviously, this can be done very quickly and easily by a single man. Since the forward edge is permanently fixed to the hopper, the cover sheet is always aligned and correctly positioned and can be put in place in a matter of seconds. Also, it will be obvious that removing the cover is equally simple and quick. When it is rolled to the forward position and tied in place, it is out of the way but is conveniently stored in a position where it is always available so that it can be put in place very quickly if necessary such as in case of sudden rain.

From the foregoing it can be seen that the present invention provides a simple and relatively inexpensive cover for a transport device such as a fertilizer spreader but which is convenient and easy to open and close and which provides a relatively good weathertight seal when it is in closed position. When it is open, it is maintained readily available and out off the way. Since it will be appreciated that various modifications of the structure may be come apparent to persons skilled in the art in view of the disclosure herein, it should be emphasized that the embodiment disclosed here is disclosed by way of example only.

The embodiments of the invention in which an exclusive property or right is claimed are defined as follows:

1. In combination with an agricultural transport device of the type having a generally rectangular hopper for containing a quantity of loose material, the hopper having a front end and rear end as determined by its normal direction of travel, a top surface and opposite side and end surfaces extending downward therefrom, the top surface having a relatively large rectangular opening therein, and a flange extending upwardly from said top surface and around substantially the entire periphery of the rectangular opening, improved cover means for said hopper comprising: a generally rectangular sheet of relatively flexible material having a length and width exceeding the length and width, respectively, of the opening in the hopper; means securing a first edge portion of said sheet is substantially weathertight relationship to the front end of the hopper in a position outside of said flange, said securing means including a rigid member extending generally parallel to the forward edge of the opening in said hopper and having one end of said sheet member sandwiched between said right member and the hopper; and a second rigid member is secured to the opposite end of said sheet member and extending substantially parallel to said first rigid member, said second rigid member facilitating securing of the opposite end of said sheet member to the hopper in an extended position and facilitating rolling of said sheet member thereon from rear to front of the hopper; means adjacent the front end of said opening for securing said sheet member in a roll, said sheet being extendable therefrom to cover the opening in its entirety and to extend beyond said opening and over said flange on each side thereof; releasable elastic fastening means including means on the three remaining edges of said sheet member and cooperating means on said hopper whereby said remaining edges may be secured to said hopper, said fastening means being disposed so that said sheet member is maintained in tension across said opening and the edges thereof are resiliently urged downwardly on the outside of said flange to provide a relatively weathertight seal with said flange.

2. The combination of claim 1 wherein the means for securing the remaining two edges of the sheet to the hopper comprise a plurality of spaced eyelets along each of the two remaining edges of said sheet, a pair of continuous elastic cord members, one laced loosely through the eyelets along each of said edges, and a plurality of cooperating hook members on the hopper over which the loops in said elastic cord member between adjacent eyelets can be hooked.

3. The combination of claim 1 wherein said sheet member is a tarp and the means for releasibly securing said remaining edges thereof the hopper comprises elastic means connected to said remaining edges thereof and cooperating with a plurality of hook members on the hopper.

4. Cover means for an agricultural transport device of the type having a hopper for containing a quantity of loose material and having a generally rectangular opening in the top thereof, the cover means comprising: a generally rectangular sheet member of relatively flexible material and having a length and width exceeding the length and width, respectively, of the rectangular opening in the hopper; means securing a first edge of said sheet member in substantially weathertight relationship to the hopper in a position outside the rectangular opening therein and in a position wherein said sheet member can be extended to cover said opening in its entirety and to extend beyond said opening on the remaining three sides thereof, said securing means including a rigid member extended generally parallel to one edge of the opening in said hopper, said one end of the sheet member being sandwiched between the rigid member and the hopper, relatively rigid means secured to said sheet member along the edge opposite said first edge; quick release fastening means on said opposite edge of said sheet member and cooperating with fastening means on said hopper for releasibly securing said opposite edge to said hopperand to maintain said sheet member and cooperating with fastening means on said hopper for releasibly securing said opposite edge to said hopper and to maintain said sheet member in tension when so secured; further means cooperable with the remaining edges of said sheet member and with said hopper for releasably securing said edges to said hopper, and means adjacent said first edge of the sheet for securing said sheet in a roll.

5. The cover means of claim 4 wherein said sheet member is a tarp and the further means for releasably securing said remaining edges thereof to the hopper comprises elastic means connected to said remaining edges thereof and cooperating with a plurality of hook members on the hopper.

6. The apparatus of claim 4 wherein the further means for securing the remaining edges includes elastic fastening members connected to said sheet member and hook means on the hopper cooperable with said elastic members to releasably secure said sheet member to said hopper and to maintain said sheet means in tension when so secured.

7. The apparatus of claim 4 wherein said hopper includes a generally flat top surface surrounding said generally rectangular opening and an upstanding flange extending substantially around the periphery of said opening; and said sheet member covers said opening and said flange in substantially weathertight relationship with said flange when in its extended position and extends only a portion of the distance between said flange and the edges of said substantially flat top surface of the hopper.

8. The apparatus of claim 7 wherein said first edge of said sheet member is secured to the flat top surface of said hopper along and generally parallel to said flange on one side of the opening and the means for securing the opposite edge of said sheet member to said hopper includes elastic fastening means connected to said sheet member in a position which is outside of the flange on said opposite edge outside of the opening, and hook means on the hopper cooperable with said elastic fastening means to secure said sheet member to said hopper.

9. The apparatus of claim 4 wherein the hopper has a front and rear as determined by its normal direction of travel and said sheet member is tightly fastened to said hopper on the front side of said opening and is extendable backward therefrom so as to cover the opening in said hopper from front to rear.

10. The apparatus of claim 9 wherein the hopper includes an upstanding flange extending substantially around said opening; said flexible sheet member is secured to said hopper forward of the forward portion of said flange and extends to a position rearward of the rear portion of said flange; and the means for securing said sheet member on the remaining edges maintain said sheet member in tension over said flange and in substantially weathertight relationship therewith.

* * * * *

PO-1050
(5/69)

UNITED STATES PATENT OFFICE
CERTIFICATE OF CORRECTION

Patent No. 3,627,376          Dated December 14, 1971

Inventor(s) Loren E. Tyler

It is certified that error appears in the above-identified patent and that said Letters Patent are hereby corrected as shown below:

Column 1, line 49, "understanding" should be --upstanding--

Column 1, line 54, "an" should be --on--

Column 1, line 58, "entirely" should be --entirety--

Column 1, line 70, "secure" should be --secured--

Column 3, line 12, "manufactures" should be --manufacturers--

Column 3, line 68, "appropriated" should be --appropriate--

Column 4, line 29, "united" should be --untied--

Column 4, line 46, "off" should be --of--

Column 4, line 66, "is" should be --in--

Column 5, line 25, after "thereof" insert --to--

Signed and sealed this 6th day of June 1972.

(SEAL)
Attest:

EDWARD M. FLETCHER, JR.          ROBERT GOTTSCHALK
Attesting Officer          Commissioner of Patents